US008918245B2

(12) United States Patent
Dewhurst et al.

(10) Patent No.: US 8,918,245 B2
(45) Date of Patent: Dec. 23, 2014

(54) METHODS AND SYSTEMS FOR PROVIDING OPEN ACCESS TO VEHICLE DATA

(75) Inventors: Chris J. Dewhurst, Fermoy (IE); Dale A. Trsar, Mount Prospect, IL (US)

(73) Assignee: Snap-on Incorporated, Kenosha, WI (US)

( * ) Notice: Subject to any disclaimer, the term of this patent is extended or adjusted under 35 U.S.C. 154(b) by 1449 days.

(21) Appl. No.: 11/758,539

(22) Filed: Jun. 5, 2007

(65) Prior Publication Data
US 2008/0306645 A1 Dec. 11, 2008

(51) Int. Cl.
G07C 5/00 (2006.01)

(52) U.S. Cl.
USPC .......... 701/31.5; 701/31.4; 709/219; 340/438

(58) Field of Classification Search
USPC ........ 701/29, 33, 31.7, 31.8, 31.9, 31.4–31.5;
340/438, 436; 709/228, 219;
707/999.003, E17.032, 999.004;
702/183–184; 714/25; 455/403, 411.4;
705/27.1
See application file for complete search history.

(56) References Cited

U.S. PATENT DOCUMENTS

| 5,764,518 | A  | * | 6/1998 | Collins | 700/95 |
|---|---|---|---|---|---|
| 6,344,853 | B1 | * | 2/2002 | Knight | 345/629 |
| 7,194,143 | B2 | * | 3/2007 | Sowa | 382/265 |
| 7,899,915 | B2 | * | 3/2011 | Reisman | 709/228 |
| 7,925,399 | B2 | * | 4/2011 | Comeau et al. | 701/33 |
| 7,987,491 | B2 | * | 7/2011 | Reisman | 725/112 |
| 8,380,158 | B2 | * | 2/2013 | McCulloch | 455/404.1 |
| 2001/0002450 | A1 | * | 5/2001 | Mizutani et al. | 701/33 |
| 2002/0062264 | A1 | * | 5/2002 | Knight | 705/26 |
| 2003/0229900 | A1 | * | 12/2003 | Reisman | 725/87 |
| 2004/0031058 | A1 | * | 2/2004 | Reisman | 725/112 |
| 2007/0011147 | A1 | * | 1/2007 | Falkenberg | 707/3 |
| 2007/0083306 | A1 | * | 4/2007 | Comeau | 701/33 |
| 2008/0040287 | A1 | * | 2/2008 | Harrell et al. | 705/71 |
| 2008/0097663 | A1 | * | 4/2008 | Morimoto | 701/29 |
| 2008/0148374 | A1 | * | 6/2008 | Spaur et al. | 726/6 |
| 2008/0306645 | A1 | * | 12/2008 | Dewhurst et al. | 701/29 |

FOREIGN PATENT DOCUMENTS

WO PCT/JP2005/011474 * 6/2005

OTHER PUBLICATIONS

Recognition, Understanding and Aestheticization of Freehand Drawing Flowcharts; Szwoch, W.; Document Analysis and Recognition, 2007. ICDAR 2007. Ninth International Conference on; vol. 2; Digital Object Identifier: 10.1109/ICDAR.2007.4377093; Publication Year: 2007 , pp. 1138-1142.*
Using the Clinical Document Architecture as Open Data Exchange Format for Interfacing EMRs with Clinical Decision Support Systems; Bilykh, I. et al.; Computer-Based Medical Systems, 2006. CBMS 2006. 19th IEEE International Symposium on; Digital Object Identifier: 10.1109/CBMS.2006.166; Publication Year: 2006 , Year: 2006 , pp. 855-860.*

(Continued)

*Primary Examiner* — Cuong H Nguyen
(74) *Attorney, Agent, or Firm* — McDonnell Boenen Hulbert & Berghoff LLP

(57) ABSTRACT

A method for providing open access to vehicle data is disclosed. From a vehicle under service, the method receives vehicle-diagnostic data in a manufacturer-specified format at a vehicle-service tool, and converts the vehicle data in the manufacturer-specified format into vehicle data in an open format.

32 Claims, 9 Drawing Sheets

(56) References Cited

OTHER PUBLICATIONS

Open metadata formats: efficient XML-based communication for heterogeneous distributed systems; Widener, P.; Schwan, K.; Eisenhauer, G.; Distributed Computing Systems, 2001. 21st International Conference on; Digital Object Identifier: 10.1109/ICDSC.2001.919013; Publication Year: 2001, pp. 739-742.*
OpenDocument Format: The Standard for Office Documents; Weir, R.; Internet Computing, IEEE; vol. 13, Issue: 2 Digital Object Identifier: 10.1109/MIC.2009.42; Publication Year: 2009, pp. 83-87.*
A Web-ready HiMASS: facilitating collaborative, reusable, and distributed modeling and execution of simulation models with XML: Daum, T.S.; Sargent, R.G.; Simulation Conference, 2002. Proceedings of the Winter: vol. 1; Digital Object Identifier: 10.1109/WSC.2002.1172941; Publication Year: 2002, pp. 634-640 vol. 1.*
Data service in Grid-based Future Control Centers; Zhou, H.F.; Wu, F.F.; Power System Technology, 2006. PowerCon 2006. International Conference on; Digital Object Identifier: 10.1109/ICPST.2006.321804; Publication Year: 2006, pp. 1-6.*
SIGIF: a digital signal interchange format with application in neurophysiology; Cunha, M.B.; Cunha, J.P.S.; Oliveira e Silva, T.; Biomedical Engineering, IEEE Transactions on; vol. 44, Issue: 5; Digital Object Identifier: 10.1109/10.568917 Publication Year: 1997, pp. 413-418.*
Integration of mobile vehicles for automated material handling using Profibus and IEEE 802.11 networks; Suk Lee; Kyung Chang Lee; Man Hyung Lee; Harashima, F.; Industrial Electronics, IEEE Transactions on; vol. 49, Issue: 3 Digital Object Identifier: 10.1109/TIE.2002.1005397; Publication Year: 2002, pp. 693-701.*
Document images analysis solutions for digital libraries; Le Bourgeois, F.; Trinh, E.; Allier, B.; Eglin, V.; Emptoz, H.; Document Image Analysis for Libraries, 2004. Proceedings. First International Workshop on; Digital Object Identifier: 10.1109/DIAL.2004.1263233; Publication Year: 2004, pp. 2-24.*
An open source based application for integration and sharing of multi-modal cardiac image data in a heterogeneous environment; Marcheschi, P.; Positano, V.; Ferdeghini, E.M.; Mazzarisi, A.; Benassi, A.;Computers in Cardiology, 2003 Digital Object Identifier: 10.1109/CIC.2003.1291168; Publication Year: 2003, pp. 367-370.*
A Remote Vehicle Diagnosis and Maintenance System Based on Internet ;Cao Kai; Yan Fuwu; Electrical and Control Engineering (ICECE), 2010 International Conference on; Digital Object Identifier: 10.1109/iCECE.2010.63 Publication Year: 2010, pp. 228-231.*
Three-way catalyst diagnostics for advanced emissions control systems; Brandt, E.P.; Grizzle, J.W.; American Control Conference, 2001. Proceedings of the 2001; vol. 5; Digital Object Identifier: 10.1109/ACC.2001.946138 Publication Year: 2001, pp. 3305-3311 vol. 5.*
XML-ECG: An XML-Based ECG Presentation for Data Exchanging; Xudong Lu; Huilong Duan; Huiying Zheng; Bioinformatics and Biomedical Engineering, 2007. ICBBE 2007. The 1st International Conference on; Digital Object Identifier: 10.1109/ICBBE.2007.295; Publication Year: 2007, pp. 1141-1144.*
Gateway system with diagnostic function for LIN, CAN and FlexRay;Tae-Yoon Moon; Suk-Hyun Seo; Jin-Ho Kim; Sung-Ho Hwang; Jaw Wook Jeon; *Control, Automation and Systems, 2007, ICCSAS '07. International Conference on*; Digitial Object Identifier: 10/1109/ICCAS.2007,4406854; Publication Year: 2007, pp. 2844-2849.*
Migrating Fault Trees to Decision Trees for Reak Time Fault Detection on International Space Station ; Lee, C.; Alena, R.L.; Robinson, P.; Aerospace Conference, 2005 IEEE Digital Object Identifier: 10.1109/AERO.2005.1559584; Publication Year: 2005, pp. 1-6.*
An extensible tool for source code representation using XML ; McArthur, G. ; Mylopoulos, J. ; Siu Kee Keith Ng Reverse Engineering, 2002. Proceedings. Ninth Working Conference on;Digital Object Identifier: 10.1109/WCRE.2002.1173078 Publication Year: 2002, pp. 199-208.*
COTS-Based Embedded Diagnostics Solutiona; Neag, I.A.; Autotestcon, 2006 IEEE Digital Object Identifier: 10.1109/AUTEST.2006.283601; Publication Year: 2006, pp. 38-44.*
Proving properties of rule-based systems; Waldinger, R.J. ; Stickel, M.E.; Artificial Intelligence Applications, 1991. Proceedings., Seventh IEEE Conference on; vol. i; Digital Object Identifier: 10.1109/CAIA.1991.120850 Publication Year: 1991, pp. 81-88.*
XML based mediation for automating the storage of SCP-ECG data into relational databases; Jumaa, H. ; Fayn, J. ; Rubel, P. Computers in Cardiology, 2008; DOI: 10.1109/CIC.2008.4749074; Publication Year: 2008, pp. 445-448.*
An open source software framework for the implementation of an open systems architecture, run-time system; Cornish, M. ; Brown, M. ; Jain, A. ; Lopes, T.; AUTOTESTCON, 2012 IEEE; DOI: 10.1109/AUTEST.2012.6334552; Pub. Year: 2012, pp. 209-214.*
Storage of online HPLC data for pharmaceutical research applications using XML database; Hapeez, M.S. et al.; Industrial Electronics and Applications (ICIEA), 2010 the 5th IEEE Conf; DOI: 10.1109/ICIEA.2010.5514740; Pub Yr: 2010, pp. 1605-1609.*
An extensible tool for source code representation using XML; McArthur, G. ; Mylopoulos, J. ; Siu Kee Keith Ng; Reverse Engineering, 2002. Proc.. Ninth Working Conf. on; DOI: 10.1109/WCRE.2002.1173078; Pub Year: 2002, pp. 199-208.*
Method and system for standardized and platform independent medical data information persistence in telemedicine; Struck, M. et al.; Computers in Cardiology, 2008; DOI: 10.1109/CIC.2008.4749026; Pub. Yr: 2008, pp. 257-260.*
Conversion between discrete images and organized 3D file formats; Congzhe Zhang et al.; Systems, Man, and Cybernetics, 2001 IEEE Inter. Conf. on; vol. 5; DOI: 10.1109/ICSMC.2001.971939; Pub. Year: 2001, pp. 2835-2839 vol. 5.*
The strategy of transfonn from XML and storage structure based on RDB for RDF; Youn Hee Kim et al.; Advanced Communication Technology, 2004. The 6th International Conf. on; vol. 2; DOI: 10.1109/ICACT.2004.1293023; Pub. Yr: 2004, pp. 1030-1034.*
An open source software framework for the implementation of an open systems architecture, run-time system; Cornish, M. et al.; AUTOTESTCON, 2012 IEEE; DOI: 10.1109/AUTEST.2012.6334552; Pub. Yr: 2012, pp. 209-214.*
Berners-Lee, Tim, Hendler, James, and Lassila, Ora, The Semantic Web, Scientific American, May 2001.

* cited by examiner

METHODS AND SYSTEMS FOR PROVIDING OPEN ACCESS TO VEHICLE DATA

RELATED FIELDS

This disclosure relates to servicing of vehicles, and more particularly, to providing access to vehicle data.

BACKGROUND

As vehicles typically require servicing over their lifetime, vehicle-scan tools may receive vehicle-diagnostic data relating to a given vehicle. The vehicle-diagnostic data may be used to diagnosis problems relating to the vehicle.

Typically, a vehicle-scan tool receives vehicle-diagnostic data in a manufacturer-specified format, and converts the vehicle-diagnostic data from the manufacturer-specified format into vehicle-diagnostic data that is stored in a closed format. A technician may use the vehicle-scan tool to display the vehicle-diagnostic data stored in the closed format, and use the displayed vehicle-diagnostic data to diagnose a fault experienced by the vehicle.

The vehicle-diagnostic data in the closed format may typically be viewed by an application on the vehicle-scan tool itself and by like tools that include similar applications created (perhaps created by the manufacturer) specifically to view the vehicle-diagnostic data in the closed format.

Manufacturers of vehicle-scan tools may have an incentive to keep the vehicle-diagnostic data produced by the vehicle-scan tool in a closed format. For instance, if the vehicle-diagnostic data on the vehicle-scan tool is kept in a closed format, the only way for a technician to further view or analyze the vehicle-diagnostic data would be to perhaps purchase additional applications provided by the same manufacturer. Hence, using the vehicle-scan tool to view closed formatted files may also require use of additional products and services provided by the manufacturer. Hence, the use of vehicle-diagnostic data in a closed format may help increase manufacturer sales.

SUMMARY

Methods and systems for providing open access to vehicle data are disclosed. According to a method, from a vehicle under service, the method includes receiving vehicle-diagnostic data in a manufacturer-specified format at a vehicle-service tool, and converting the vehicle-diagnostic data in the manufacturer-specified format into vehicle data in an open format.

The method may further include transmitting the vehicle data in the open format to a remote device. The vehicle data in the open format may include a plurality of parameters, and the method may include determining a correlation between a first parameter and a second parameter in the plurality of parameters, and displaying a representation of the correlation between the first parameter and the second parameter. Additionally or alternatively, the method may include formulating a new parameter based on a first parameter and a second parameter, and providing an indication of the new parameter.

According to a system that includes a vehicle-service tool, from a vehicle under service, the vehicle-service tool receives vehicle-diagnostic data in a manufacturer-specified format, and converts the vehicle-diagnostic data in the manufacturer-specified format into vehicle data in an open format.

The system may further include a remote device, and the vehicle-service tool may transmit the vehicle data in the open format to the remote device. The vehicle data in the open format may include a plurality of parameters, and the remote device may determine a correlation between a first parameter and a second parameter in the plurality of parameters, and display a representation of the correlation between the first parameter and the second parameter. Additionally or alternatively, the remote device may formulate a new parameter based on a first parameter and a second parameter, and cause a user interface to provide an indication of the new parameter.

According to another system, the system includes a vehicle interface to receive, from a vehicle under service, vehicle-diagnostic data in a manufacturer-specified format, a processor, and data storage comprising instructions executable by the processor to convert the vehicle-diagnostic data in the manufacturer-specified format into vehicle data in an open format.

The vehicle data in the open format may include a plurality of parameters, and the data storage may further include instructions to determine a correlation between a first parameter and a second parameter in the plurality of parameters, and cause a user interface to display a representation of the correlation between the first parameter and the second parameter. Additionally or alternatively, the data storage may further include instructions to formulate a new parameter based on a first parameter and a second parameter, and cause a user interface to provide an indication of the new parameter.

These as well as other aspects and advantages will become apparent to those of ordinary skill in the art by reading the following detailed description, with reference where appropriate to the accompanying drawings. Further, it is understood that this summary is merely an example and is not intended to limit the scope of any claims.

BRIEF DESCRIPTION OF THE DRAWINGS

Various examples of embodiments arranged as a method or system are described herein with reference to the following drawings, in which.

DETAILED DESCRIPTION

I. Overview

Figure 1:
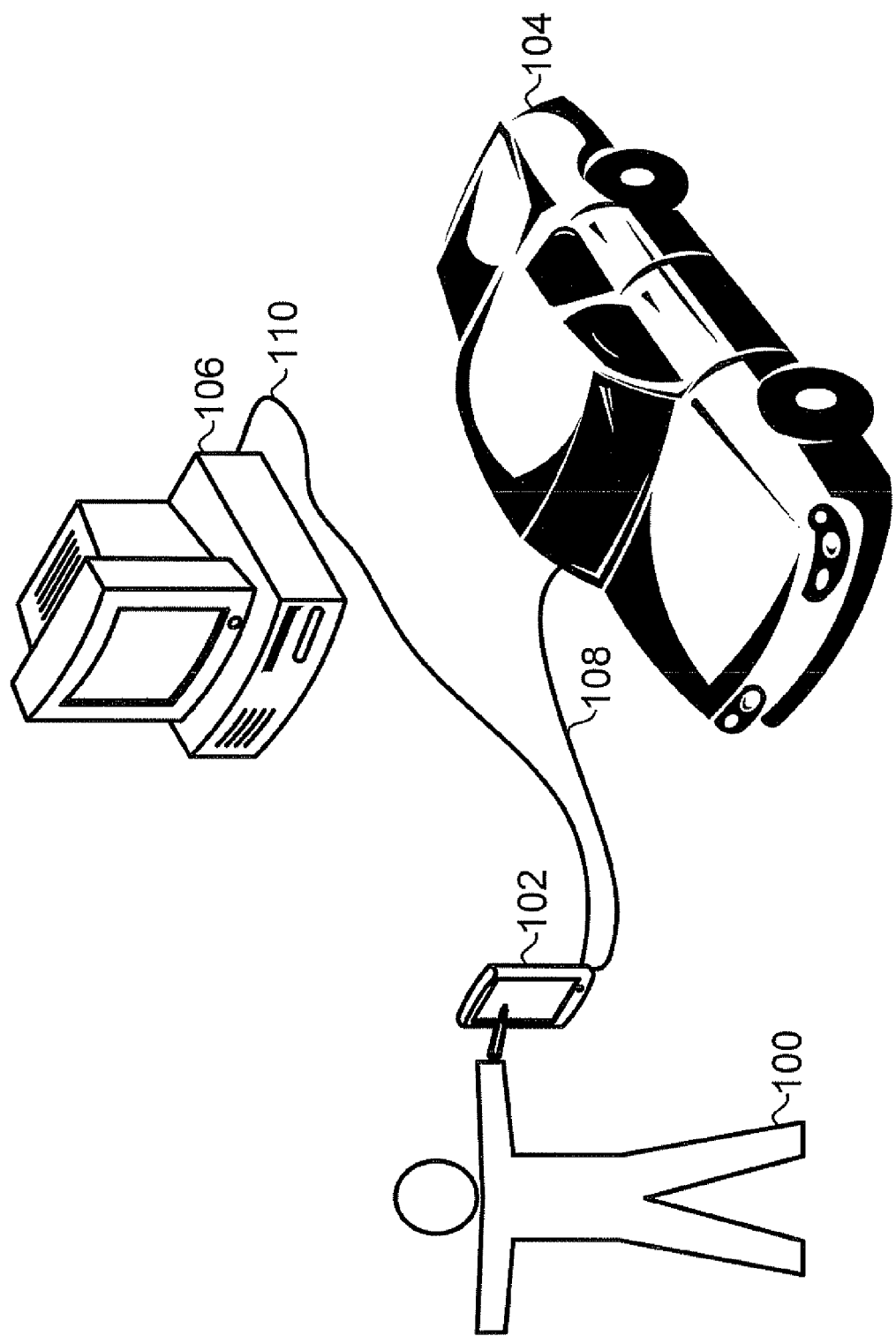
FIG. 1 depicts a simplified block diagram of a system for diagnosing a vehicle, according to an example embodiment.

As noted, a vehicle-scan tool typically receives vehicle-diagnostic data in a manufacturer-specified format, and converts the vehicle-diagnostic data in the manufacturer-specified format into vehicle-diagnostic data in a closed format."

Since the vehicle-diagnostic data is in a closed format, the data may not be utilized by a third-party device or application. For a third party to view such data, the third party may be required to purchase proprietary software from the manufacture or a licensed distributor, as examples. Hence, the availability to third patties to view such vehicle-diagnostic data is limited.

Also as noted, manufacturers of vehicle-scan tools may have an incentive to keep such vehicle-diagnostic data in a closed format. For instance, using a vehicle-scan tool that produces vehicle-diagnostic data in a closed format may require use of additional products and services provided by the manufacturer (or other licensed distributors) to further view or access the vehicle-diagnostic data. Thus, using vehicle-diagnostic data in a closed format may help promote manufacturer sales.

Although seemingly counterintuitive, methods and systems for providing open access to vehicle data are disclosed. According to a method, from a vehicle under service, the method includes receiving vehicle-diagnostic data in a manufacturer-specified format at a vehicle-service tool, and converting the vehicle data in the manufacturer-specified format into vehicle data in an open format. The method may further include transmitting the vehicle data in the open format to a remote device.

As examples, the open format may include a format that is usable (e.g., viewable) by any of a variety of standard applications (e.g., Microsoft Word, Microsoft Excel, Internet Explorer, Mozilla Firefox, and other common applications), a format that is well-known and/or well-defined by industry standards, a non-proprietary format, a format that does not require a license for use, a markup-language format (e.g., Extensible Markup Language (XML)), and/or a metadata format (e.g., Resource Description Framework).

By providing vehicle data in an open format, third parties will have greater access to the vehicle data. In particular, third patties will not be required to purchase proprietary software from the manufacturer, for instance, to view the vehicle data. When third parties have greater (i e, open) access to such vehicle data, a larger community of people will have more opportunity to create and share new developments and processes relating to the vehicle data—more so than when access to the vehicle data is restricted. As examples, by providing open access to such vehicle data, third parties may create and share software tools relating to the vehicle data, determine new correlations between parameters, formulate new relevant parameters, develop new ways to display how parameters are correlated, and develop other innovations. Further, by providing the vehicle data in an open format that can be viewed by any of a variety of standard applications (e.g., standard internet tools, such as the search feature of Google, may be used to categorize and/or search the vehicle data), for instance, and by transmitting the vehicle data to a remote device, the vehicle data may be more accessible and/or portable.

II. Exemplary Architecture

FIG. 1 depicts a simplified block diagram of a system for diagnosing a vehicle, according to an example. It should be understood, however, that this and other arrangements described herein are provided for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location, and as any suitable combination of hardware, firmware, and/or software.

As shown in FIG. 1, a service technician 100 is using a vehicle-service tool 102 that interfaces to a vehicle 104 (e.g., a vehicle under service) and to a remote vehicle-service tool interface device 106. Vehicle-service tool 102 may interface to vehicle 104 via a vehicle-interface cable 108. Alternatively or additionally, vehicle-service tool 102 may interface to vehicle 104 via an air interface (i.e., wirelessly). Vehicle-service tool 102 may interface to the interface device 106 via a network cable 110, such as an Ethernet network cable. Alternatively or additionally, vehicle-service tool 102 may interface to interface device 106 via an air interface.

Additional entities could be present, such as additional vehicle-service tools in communication with interface device 106 and other remote devices and/or processors, and additional interface devices in communication with yet other remote devices and/or processors. Other variations and/or additions are possible as well.

Vehicle-service tool 102 may be arranged in any of a variety of configurations. For example, vehicle-service tool 102 may be arranged as a portable handheld-service tool that can be carried by service technician 100 to a location desired by the service technician 100, such as the front seat of vehicle 104 or an engine compartment under a hood of vehicle 104. As another example, vehicle-service tool 102 may be arranged as a desktop personal computer placed on a roll-around cart that may be rolled in proximity to vehicle 104. Other exemplary arrangements of vehicle-service tool 102 are also possible.

Vehicle 104 is an automobile. Alternatively, and by way of example, a vehicle that communicates with vehicle-service tool 102 may comprise a truck, a boat or ship, a motorcycle, a generator, or an airplane. Any of these vehicles may be a vehicle under service. Other examples of a vehicle that communicates with vehicle-service tool 102 are also possible.

Vehicle-service tool interface device 106 may comprise any of a variety of devices. For example, interface device 106 may comprise a network server that is communicatively coupled to a packet data network (PDN) such as the Internet. Alternatively or additionally, the interface device 106 may include a desktop computer executing computer-readable program instructions to carry out service shop management functions and/or to provide vehicle-reference data to vehicle-service tool 102. Other examples of interface device 106 are also possible.

The embodiments described herein may include or be utilized with any appropriate voltage or current source, such as a battery, an alternator, a fuel cell, and the like, providing any appropriate current and/or voltage, such as about 12 Volts, about 42 Volts and the like.

Additionally, the embodiments described herein may be used with any desired system or engine. Those systems or engines may comprise items utilizing fossil fuels, such as gasoline, natural gas, propane and the like, electricity, such as that generated by battery, magneto, fuel cell, solar cell and the like, wind and hybrids or combinations thereof. Those systems or engines may be incorporated into other systems, such as an automobile, a truck, a boat or ship, a motorcycle, a generator, an airplane and the like.

Figure 2:
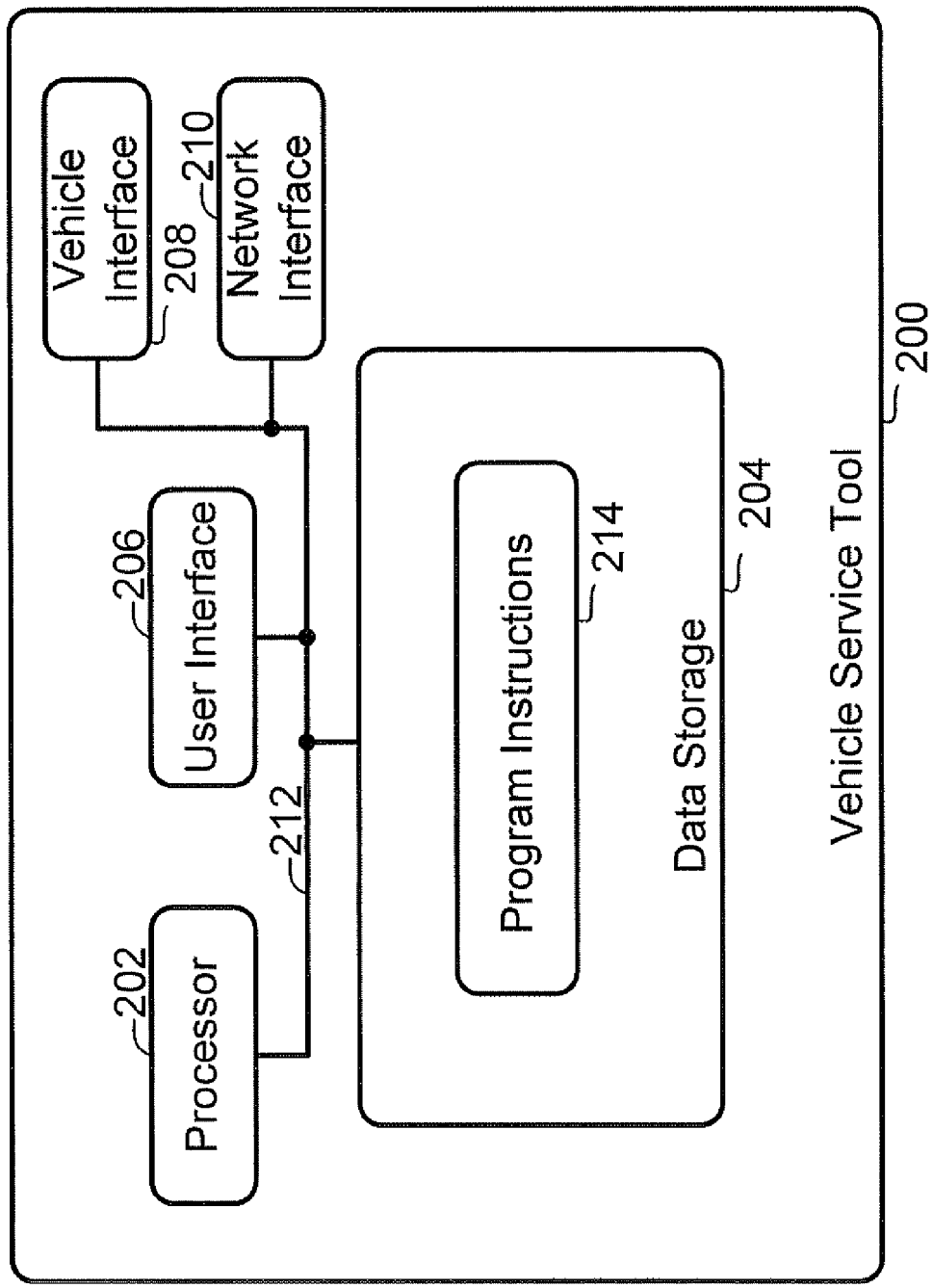
FIG. 2 depicts a simplified block diagram of a vehicle-scan tool, according to an example embodiment.

FIG. 2 depicts a vehicle-service tool 200, according to an example. As shown in FIG. 2, vehicle-service tool 200 comprises a processor 202, data storage 204, a user interface 206, a vehicle interface 208, and a network interface 210, all linked together via a system bus, network, or other connection mechanism 212. Vehicle-service tool 102 of FIG. 1 may be configured as vehicle-service tool 200. In this regard, vehicle interface 208 may connect to vehicle-interface cable 108 for carrying communications between vehicle-service tool 200 and vehicle 104, and network interface 210 may connect to network cable 110 for carrying communications between vehicle-service tool 200 and vehicle-service tool interface device 106.

User interface 206 may comprise any of a variety of user interface components. For example, user interface 206 may comprise one or more outputs to present visual and/or non-visual information to a user. As an example, the output may include a display for displaying data to a user, such as vehicle reference data and/or a message for prompting a user to enter data via the user interface 206. The display may comprise a liquid crystal display (LCD) display, a cathode ray tube (CRT) display, a plasma display, or another type of display. As another example, the output may include a loudspeaker to output auditory information.

Additionally, user interface 206 may include one or more inputs to receive information from a user. As examples, the input may comprise a data entry component, such as a keyboard in a QWERTY keyboard arrangement, a touch screen such as a resistive or capacitive touch screen, or another type of data entry component. As another example, the input may include a microphone to receive auditory information. Of course, other examples exist for user interface 206.

Processor 202 may comprise one or more general-purpose processors (e.g., INTEL microprocessors) and/or one or more special-purpose processors (e.g., digital signal processors). Processor 202 may execute computer-readable program instructions, such as the program instructions described below.

Data storage 204 comprises a computer-readable medium. A computer-readable medium may comprise volatile and/or non-volatile storage components, such as optical, magnetic, organic or other memory or disc storage, which can be integrated in whole or in part with a processor, such as processor 202. Alternatively, the entire computer-readable medium may be remote from processor 202 and coupled to processor 202 by connection mechanism 212 and/or network cable 110.

Data storage 204 may store various types of data, such as vehicle-diagnostic data in a manufacturer-specified format or in a closed format, vehicle data in an open format, and computer-readable program instructions 214. The program instructions 214 may comprise computer-readable program instructions executable by processor 202.

As examples, the program instructions 214 executable by processor 202 may include: (i) instructions to convert vehicle-diagnostic data in a manufacturer-specified format into vehicle data in an open format, (ii) instructions to transmit the vehicle-diagnostic data in the manufacturer-specified format to a remote processor, (iii) instructions to convert the vehicle-diagnostic data in the manufacturer-specified format into vehicle-diagnostic data in a closed format, (iv) instructions to convert the vehicle-diagnostic data in the closed format into the vehicle data in the open format, (v) instructions to transmit the vehicle data in the open format to a remote device, (vi) instructions to determine a correlation between a first parameter and a second parameter in a plurality of parameters, (vii) instructions to display a representation of the correlation between the first parameter and the second parameter, (viii) instructions to formulate a new parameter based on a first parameter and a second parameter in a plurality of parameters, and (ix) instructions to provide an indication of the new parameter.

III. Exemplary Operation

A. Introduction

Figure 3:
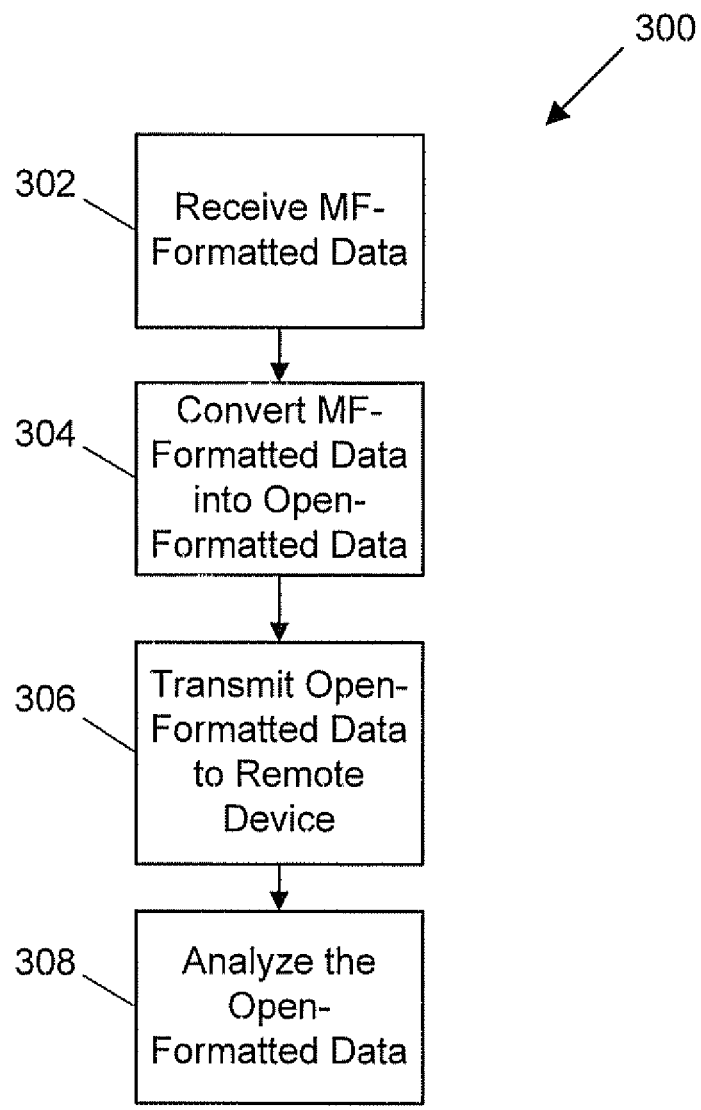
FIG. 3 is a flow chart of a method for providing open access to vehicle data, according to an example embodiment.

FIG. 3 is a flow chart of a method 300 for providing open access to vehicle data, according to an example. Two or more of the functions shown in FIG. 3 may occur substantially simultaneously. Further, not all of the functions shown in FIG. 3 are required in order to carry out the method 300.

The vehicle-service tool 102 may be communicatively coupled to the vehicle 104, and the technician 100 may select a particular mode of operation for the vehicle-service tool 102 (e.g. a diagnostic mode). Using the vehicle-service tool 102, the technician 100 may request vehicle-diagnostic data from the vehicle 104, and the vehicle 104 may then responsively send vehicle-diagnostic data to the vehicle-service tool 102.

As shown in FIG. 3, at block 302, from the vehicle 104 under service, the method 300 includes receiving vehicle-diagnostic data in a manufacturer-specified format (hereinafter referred to as "MF-formatted data") at the vehicle-service tool 102. Next, at block 304, the method 300 includes converting the MF-formatted data into vehicle data in an open format (hereinafter referred to as "open-formatted data"). Next, at block 306, the method 300 includes transmitting the open-formatted data to a remote device. Next, at block 308, the method 300 includes analyzing the open-formatted data. The illustrated functions are explained in the following section.

B. Method Steps i. Receiving Vehicle-Diagnostic Data in Manufacturer-Specified Format At block 302, from the vehicle 104 under service, the method 300 includes receiving MF-formatted data at the vehicle-service tool 102. The manufacturer-specified format data may include any of a variety of standards, such as the European On-Board Diagnostics (EOBD) standard, the Society of Automotive Engineers (SAE) J-1850 standard, the ISO9141 standard, or the ISO9141-2 standard. Further, the manufacturer-specified format may include proprietary and/or non-proprietary standards, published and/or non-published standards, and other types of standards as well.

Figure 4:
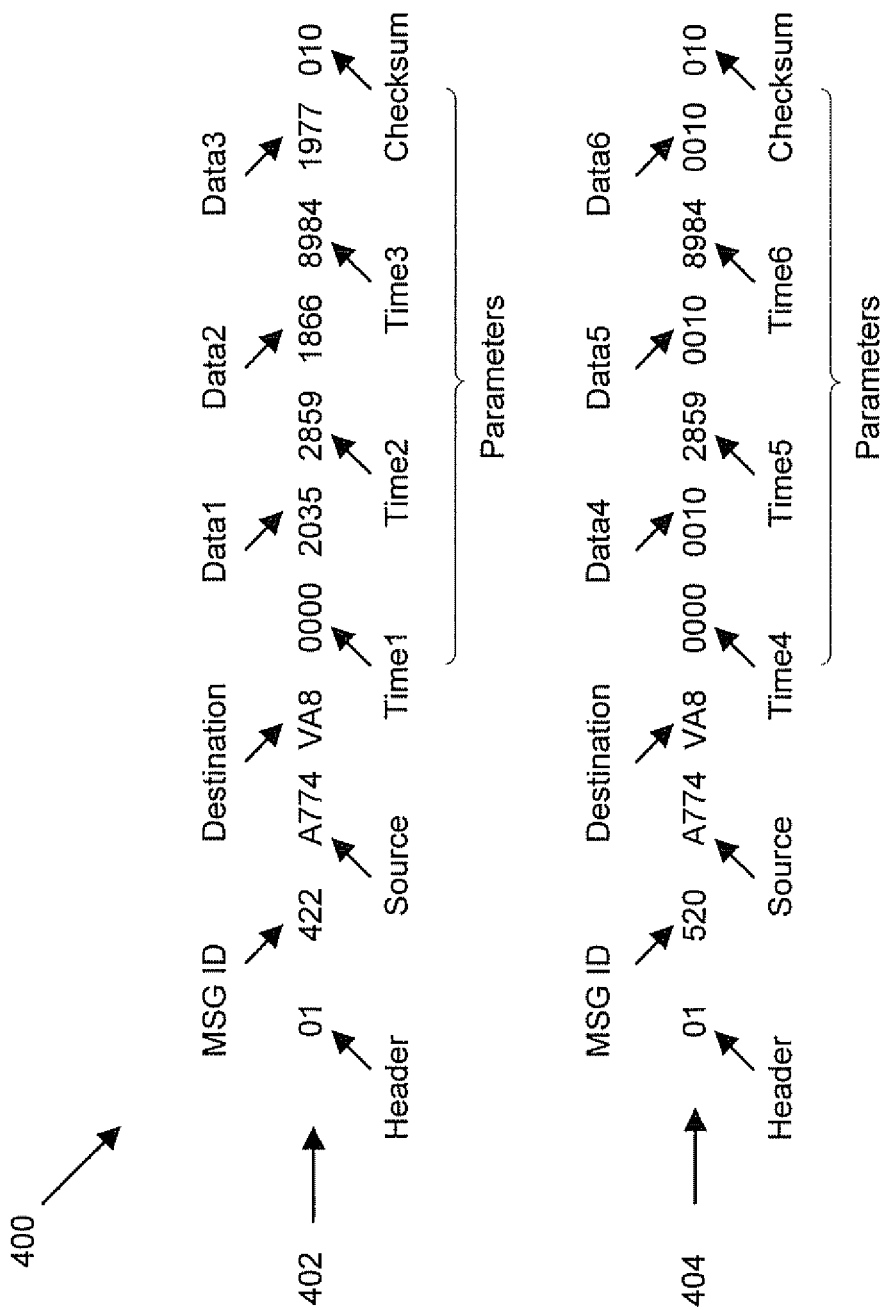
FIG. 4 is a simplified illustration of vehicle-diagnostic data in a manufacturer-specified format, according to an example embodiment.

The MF-formatted data (i.e. the vehicle-diagnostic data in the manufacturer-specified format) may take a variety of forms. FIG. 4 is a simplified illustration of MF-formatted data 400, according to an example embodiment. As shown in FIG. 4, the MF-formatted data 400 includes a data string set 402 and a data string set 404. Each of the data string sets 402 and 404 includes a header, message ID, source, destination, parameters, and a checksum. The header and checksum for each of the data string sets 402 and 404 indicate the beginning and end, respectively, of the corresponding data string sets. Further, the source in each of the data string sets 402 and 404 indicates that the vehicle-diagnostic data originates from an electronic control unit of the vehicle 104, for instance, and the destination in each of the data string sets 402 and 404 indicates where the corresponding data string sets 402 and 404 will be transmitted (i.e., the vehicle-service tool 102).

The message ID 422 of the data string set 402 may indicate that the data string set 402 relates to engine revolutions per minute (RPM). Further, the message ID 422 may indicate that the parameters of the data string set 402 include three sample times (in milliseconds) and three corresponding data measurements. Further, the parameters for the data string set 402 include sample times Time1, Time2, and Time3, and three corresponding data samples Data1, Data2, and Data3. In this example, the sample times and corresponding data samples are stored as respective numeric values. However, the sample times and corresponding data samples may be stored as other values, such as Boolean values.

Likewise, the message ID 520 of the data string set 404 may indicate that the data string set 404 relates to manifold absolute pressure (MAP) data detected by a MAP sensor located on vehicle 104, and that the MAP includes kilopascals as a unit of measurement. Further, the message ID 520 may indicate that the parameters of the data string set 404 include three sample times (in milliseconds) and three corresponding data samples. Further, the parameters for the data string set 404 include sample times Time4, Time5, and Time6, and three corresponding data samples Data4, Data5, and Data6. Similarly, in this example, the sample times and corresponding data samples are stored as respective numeric values. However, the sample times and corresponding data samples may be stored as other values, such as Boolean values.

Alternatively, the data string sets 402 and 404 (or MF-formatted data, more generally) may not include sample times Rather than the MF-formatted data including sample times, the vehicle-service tool 102 (or receiving device, more generally) may add a timestamp corresponding to the time (in milliseconds) it receives the respective data samples Of course, other examples exist for the MF-formatted data.

ii. Converting the Vehicle-Diagnostic Data in Manufacturer-Specified Format

Figure 5:
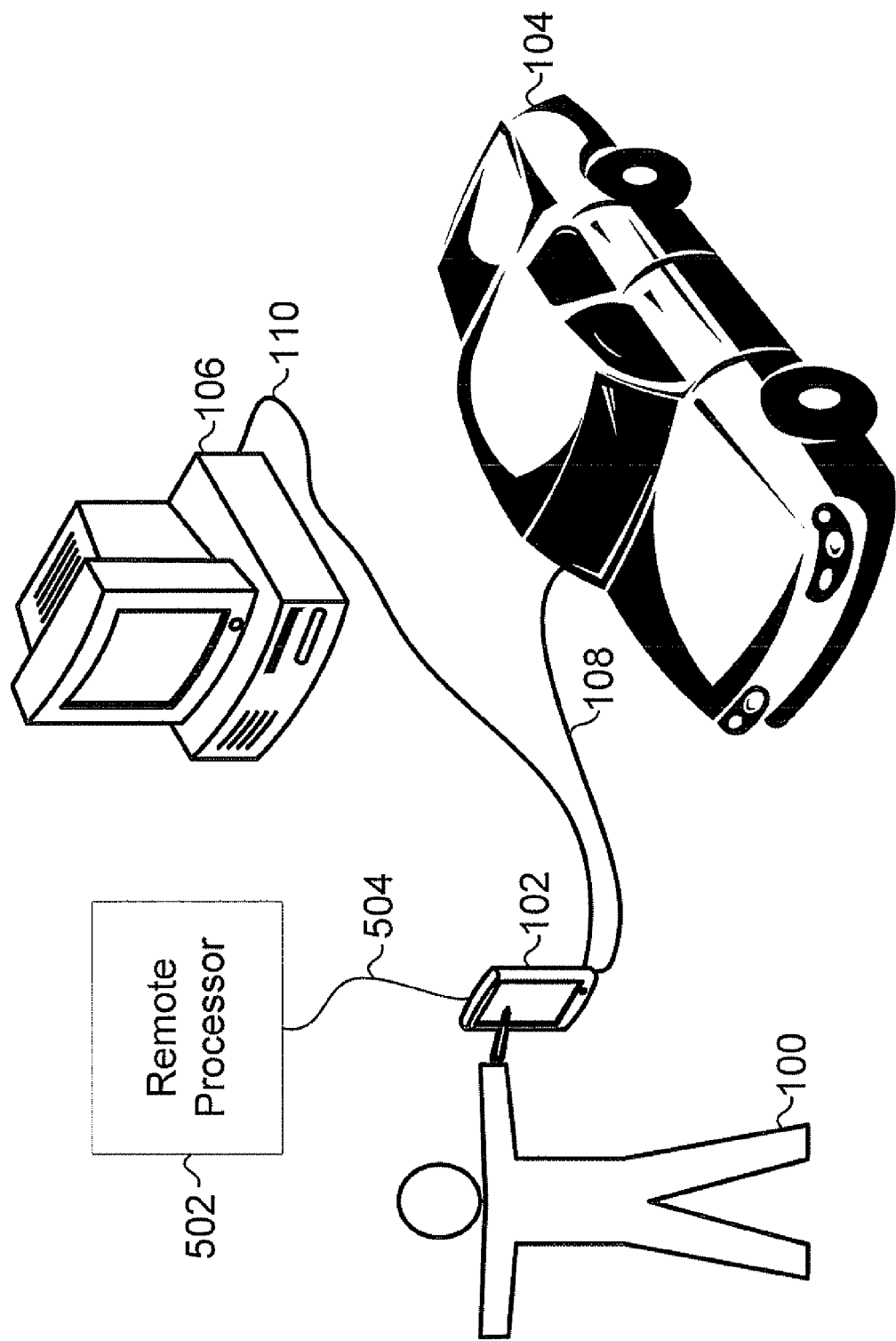
FIG. 5 depicts a simplified block diagram of a system for diagnosing a vehicle, according to an example embodiment.

At block 304, the method 300 includes converting the MF-formatted data into the open-formatted data. As an example, the vehicle-service tool 102 may convert the MF-formatted data into the open-formatted data. Additionally or alternatively, the vehicle-service tool 102 may transmit the MF-formatted data to a remote processor 502 (as shown in FIG. 5), and the remote processor 502 may convert the MF-formatted data into the open-formatted data. The remote processor 502 may be arranged in a variety of configurations. As examples, the remote processor 502 may be included in the interface device 106, or may be included in another device altogether. Also as depicted, the vehicle-service tool 102 is communicatively coupled to the remote processor 502 via wired link 504. However, a wireless link may be used instead for communications to be carried between vehicle-service tool 102 and remote processor 502.

Converting the MF-formatted data into the open-formatted data may occur in a variety of ways. For instance, the method 300 may include automatically converting the MF-formatted data into to the open-formatted data in response to receiving the MF-formatted data. Automatically converting the MF-formatted data may include converting only after all of the MF-formatted data is received, after a predetermined portion is received, or while the MF-formatted data is received, as examples.

As another example, converting the MF-formatted data into the open-formatted data may occur in response to receiving from a user interface an instruction to convert the MF-formatted data into the open-formatted data. For instance, after the vehicle-service tool 102 receives the MF-formatted data, the vehicle-service tool 102 may present to the technician 100 (or user, more generally) via the user interface 206 with an option of whether to convert the MF-formatted data into the open-formatted data. After receiving from the user interface 206 an instruction to convert the MF-formatted data, the vehicle-service tool 102 may then convert the MF-formatted data into the open-formatted data.

The open format may take a variety of formats. As examples, the open format may include a format that is usable by any of a variety of standard applications (e.g., Microsoft Word, Microsoft Excel, Internet Explorer, Mozilla Firefox, and other common applications), a format that is well-known (e.g., a format that is established in the software industry as a well-known format to store data and widely used to store data) and/or well-defined (e.g., the definition of the format standardized such that when data is stored in the format, a system capable of reading the format will be able to read the data stored in that format), a non-proprietary format, a format that does not require a license for use, a markup-language format (e.g., XML), and/or a metadata format (e.g., RDF).

Regarding markup-language formats, markup-language data typically includes primary text and extra information about the primary text. The extra information (e.g., about the primary text's structure) may be expressed using tags that are intermingled with the primary text. As an example, vehicle data in a markup-language format (hereinafter referred to as "markup-formatted data") may include a plurality of tags and a structure to cooperatively describe the vehicle data.

Further, the markup-language format may include any of a variety of formats. As examples, the markup-language format may include an XML format, a Hypertext Markup Language (HTML) format, a Standard Generalized Markup Language (SGML) format, and an Extensible Hypertext Markup Language (XHTML) format. Other examples of markup-language formats also exist, and any combination of the above markup-language formats may be used.

Figure 6:
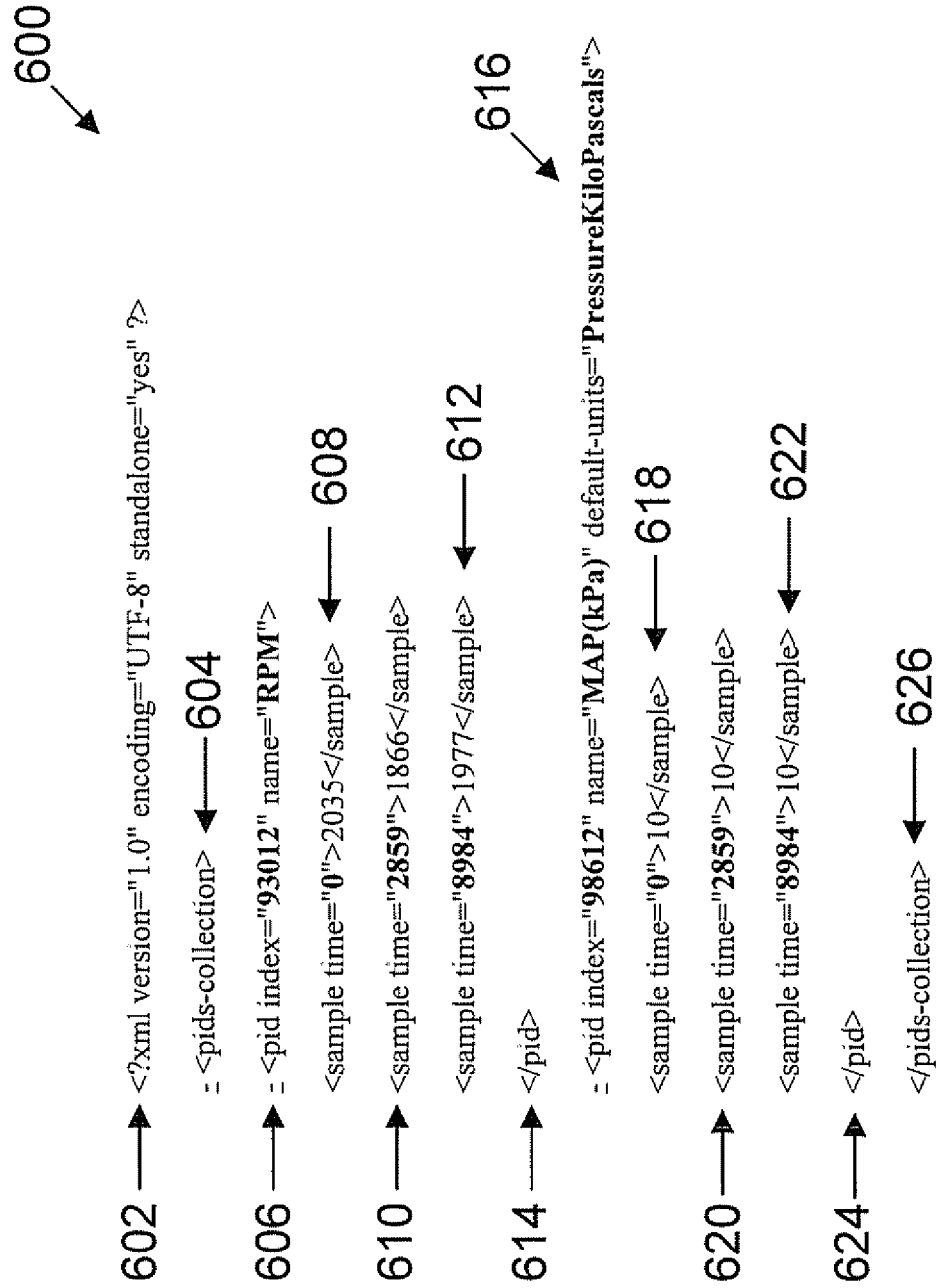
FIG. 6 is an illustration of vehicle data in an XML data file, according to an example embodiment.

Converting the MF-formatted data into markup-formatted data may include extracting the vehicle data from the MF-formatted data, associating the vehicle data to corresponding tags, and writing the vehicle data and corresponding tags to a markup-language data file. FIG. 6 is an illustration of vehicle data in an XML data file 600, according to an example embodiment. In this example, converting the MF-formatted data into markup-formatted data includes extracting the respective message IDs and parameters from the data string sets 402 and 404, associating the respective message IDs and parameters to corresponding predefined tags, and writing the vehicle data and corresponding tags to the XML data file 600.

To illustrate, line 602 includes a tag that indicates the beginning of the XML data file 600. Line 604 includes a tag that indicates that this data file includes vehicle data in the form of various Parameter Identifications (PIDs). Line 606 includes extracted information from the message ID 422 of the data string set 402, and includes tags indicating that this particular PID relates to RPM Each of the lines 608, 610, and 612 includes extracted parameters from the data string set 402, and includes corresponding identifier tags. In particular, line 608 includes the sample time Time1 and corresponding data sample Data1, line 610 includes the sample time Time2 and corresponding data sample Data1, and line 612 includes sample time Time3 and corresponding data sample Data3. Further, line 614 includes a tag indicating the end of this specific PID.

In this example, each of the sample times and corresponding data samples are stored as numeric values in the MF-formatted data 400, extracted as numeric values, and written to the XML data file 600 as numeric values. However, in other examples, the sample times and corresponding data samples may be stored as Boolean values, for instance, extracted as Boolean values, converted to numeric values, and written to the XML data file 600 as numeric values. Of course, other examples exist for storing, extracting, converting, and writing the sample times and corresponding data samples to the XML data file 600.

In yet other examples, if the MF-formatted data 400 does not include sample times, the data samples may be extracted from the MF-formatted data 400, corresponding timestamps may be added to the respective data samples by the vehicle-service tool 102, for instance, and the data samples and corresponding timestamps may be written to the XML data file 600. Of course, other examples exist for adding data to the XML data file 600.

Further, line 616 includes extracted information from the message ID 520 of the data string set 402, and includes tags indicating that this particular PID relates to MAP, and that kilopascals are the units of measurement for the MAP. Each of the lines 618, 620, and 622 includes extracted parameters from the data string set 404, and includes corresponding identifier tags. In particular, line 618 includes sample time Time4 and corresponding data sample Data4, line 610 includes the sample time Time5 and corresponding data sample Data5, and line 612 includes sample time Time6 and corresponding data sample Data6. Further, line 624 includes a tag indicating the end of this specific PID, and line 626 includes a tag indicating the end to the vehicle data (or an end to the collection of PIDs, more generally).

As illustrated, the lines of the XML, data file 600 are organized in a structure. Namely, the PID relating to RPM (i.e., the vehicle data relating to RPM and the RPM sample times and corresponding data samples) is located in one section of the XML data file 600, while the PID relating to MAP (i.e., the vehicle data relating to MAP and the MAP sample times and corresponding data samples) is located in another section of the XML data file 600. Such a structure may be used to help describe the vehicle data and increase the readability of the XML data file 600. Of course, other examples exist for organizing the XML data file 600, and converting the MF-formatted data into the markup-formatted data.

In some embodiments, converting the MF-formatted data into the open-formatted data may include the vehicle-service tool converting the MF-formatted data into vehicle-diagnostic data in a closed format ("closed-formatted data"). The closed-formatted data may be readable by a particular application on the vehicle-service tool 102. The method 300 may then include converting the closed-formatted data into the open-formatted data.

Figure 7:
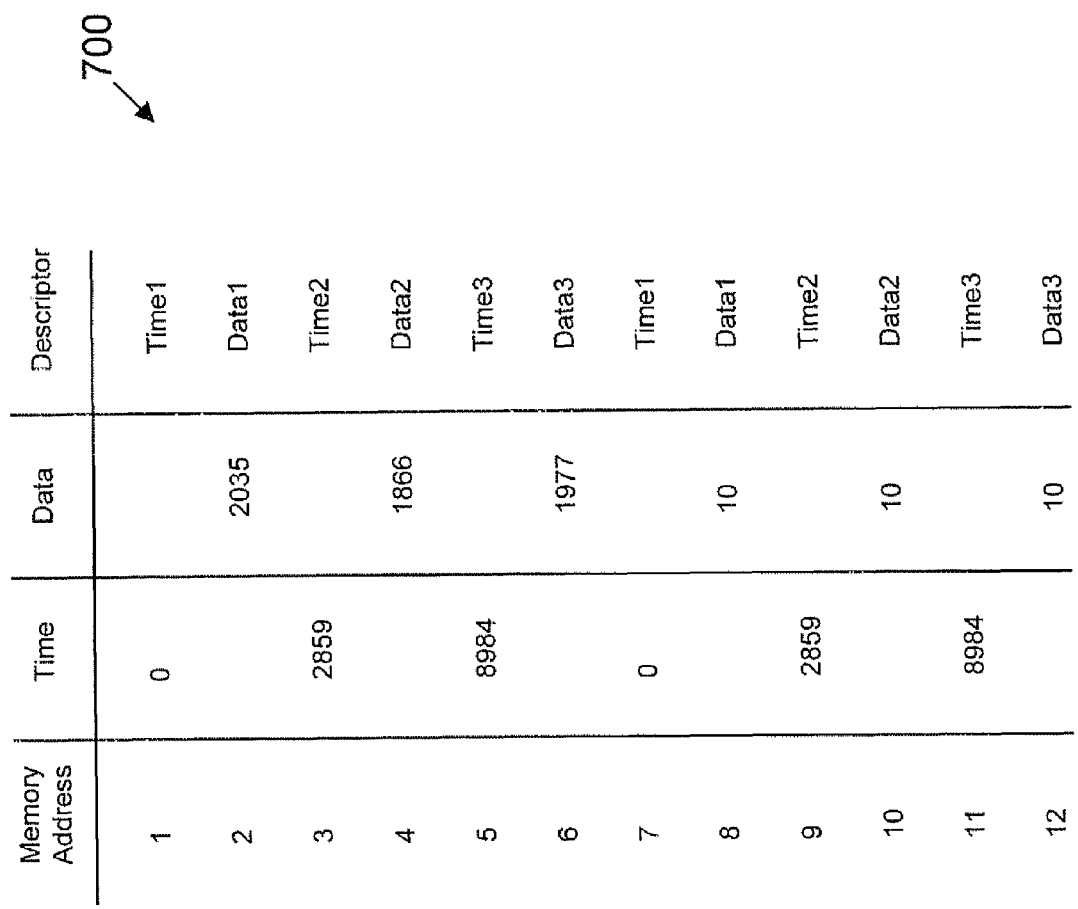
FIG. 7 is an illustration of closed-formatted data, according to an example embodiment.

The closed-formatted data may take a variety of forms. FIG. 7 is an illustration of closed-formatted data 700, according to an example embodiment. As shown, the closed-formatted data 700 includes memory addresses 1 through 12, with each memory address including a descriptor and a parameter, the parameter including either a sample time or data sample. As an example, memory address 1 includes the sample time Time1, and a descriptor for Time1, and memory address 2 includes the data sample Data1, and a descriptor for Data1. The descriptor for Time1 may indicate that the sample time is in milliseconds and relates to RPM, and the descriptor for Data2 may indicate that the data sample relates to RPM. Further, although the sample times and data samples are stored as numeric values, the closed-formatted data may store the sample times and data samples as other values, such as Boolean values.

Further, converting the closed-formatted data into the open-formatted data may occur in a variety of ways. For instance, the method 300 may include automatically converting the closed-formatted data into to the open-formatted data in response to converting the MF-formatted data into the closed-formatted data. As another example, converting the closed-formatted data into the open-formatted data may occur in response to receiving from a user interface an instruction to convert the closed-formatted data into the open-formatted data.

Regarding vehicle data in a markup-language format (i.e., markup-formatted data), converting the closed-formatted data into the markup-formatted data may include extracting the vehicle data from the closed-formatted data 700, associating the vehicle data to corresponding tags, and writing the vehicle data and corresponding tags to a markup-language data file. As noted, FIG. 6 is an illustration of vehicle data in the XML data file 600, according to an example embodiment. In this example, converting the closed-formatted data 700 into the XML data file 600 includes extracting the descriptors and either a time value or data value from each of the memory addresses, associating the respective descriptors and either the time or data values to corresponding predefined tags, and writing the vehicle data and corresponding tags to the XML data file 600. Further, the sample times and data samples may be extracted and written to the XML data file 600, or may be extracted and converted to another form before being written to the XML data file 600. Of course, other examples exist for converting the MF-formatted data and/or closed-formatted data into the open-formatted data.

iii. Transmitting the Vehicle Data in the Open-Language Format to a Remote Device At block 306, the method 300 transmits the open-formatted data to a remote device. The remote device may be located in close proximity to the vehicle-service tool 102 (i.e., in the same location where the vehicle 104 is serviced), or may be remotely located.

The remote device may include a variety of devices. As examples, the remote device may include the interface device 106, a network server communicatively coupled to a PDN such as the Internet, a mobile device communicatively coupled to a wireless network, a desktop or notebook computer, or a portable storage device. Further, the remote device may include a plurality of devices. Additionally, the remote device may include a network interface, a user interface, a processor, and data storage including program instructions executable by the processor. Other examples of the remote device also exist.

Once the method 300 transmits the open-formatted data to the remote device, the open-formatted data may be more accessible and/or portable. For instance, if the remote device includes a laptop computer located in close proximity to the vehicle-service tool 102, a technician 100 may use Microsoft Excel, or any other application on the laptop computer capable of utilizing files in an open format, to view the open-formatted data. Since the open-formatted data is viewable on the laptop computer, which is portable, the technician 100 may view the open-formatted data in any of a variety of locations. In some embodiments, the laptop computer may be communicatively coupled to a privately-operated intranet, and the open-formatted data may be shared on the intranet. In such a case, another user operating an authorized device that is also communicatively coupled to the privately-operated intranet may also view the open-formatted data.

As another example, if the remote device includes a network server communicatively coupled to the Internet, a third party using a desktop computer communicatively coupled to the Internet may also view the open-formatted data (e.g., by using a standard internet tool, such as the search feature of Google). Hence, by transmitting the open-formatted data to a remote device, the markup-formatted data may be more accessible and/or portable.

iv. Analyzing the Open-Formatted Data

At block 308, the method 300 includes analyzing the open-formatted data. Any of a variety of devices may analyze the open-formatted data. For instance, the remote device that receives the MF-formatted data may analyze the open-formatted data. Additionally or alternatively, the vehicle-service tool 102 may analyze the open-formatted data. Of course, other devices and/or entities may also analyze the open-formatted data.

In one respect, analyzing the open-formatted data may include determining a correlation between a first parameter and a second parameter. As an example, the first and second parameters may include a cam shaft sensor pulse count parameter and a crank shaft sensor pulse count parameter, respectively. For every revolution of the crank shaft, the crank shaft sensor will produce a certain number of pulses. In response to the crank shaft revolutions, the cam shaft sensor will produce a corresponding number of pulses. Determining the correlation between the cam shaft sensor pulse count parameter and the crank shaft sensor pulse count parameter may include determining the number of crank shaft sensor pulses and the corresponding number of cam shaft sensor pulses over a given period of time. As an example, the crank shaft sensor pulse count and corresponding cam shaft sensor pulse count may be measured at time $T_0$ (e.g., 0 seconds), $T_1$ (e.g., 10 seconds), and $T_2$, (e.g., 20 seconds). If the crank shaft sensor pulse count consistently remains proportional to the corresponding cam shaft sensor pulse count over the given period of time, then the technician 100 (or a third party) may determine that each of the sensors are working properly.

Figure 8:
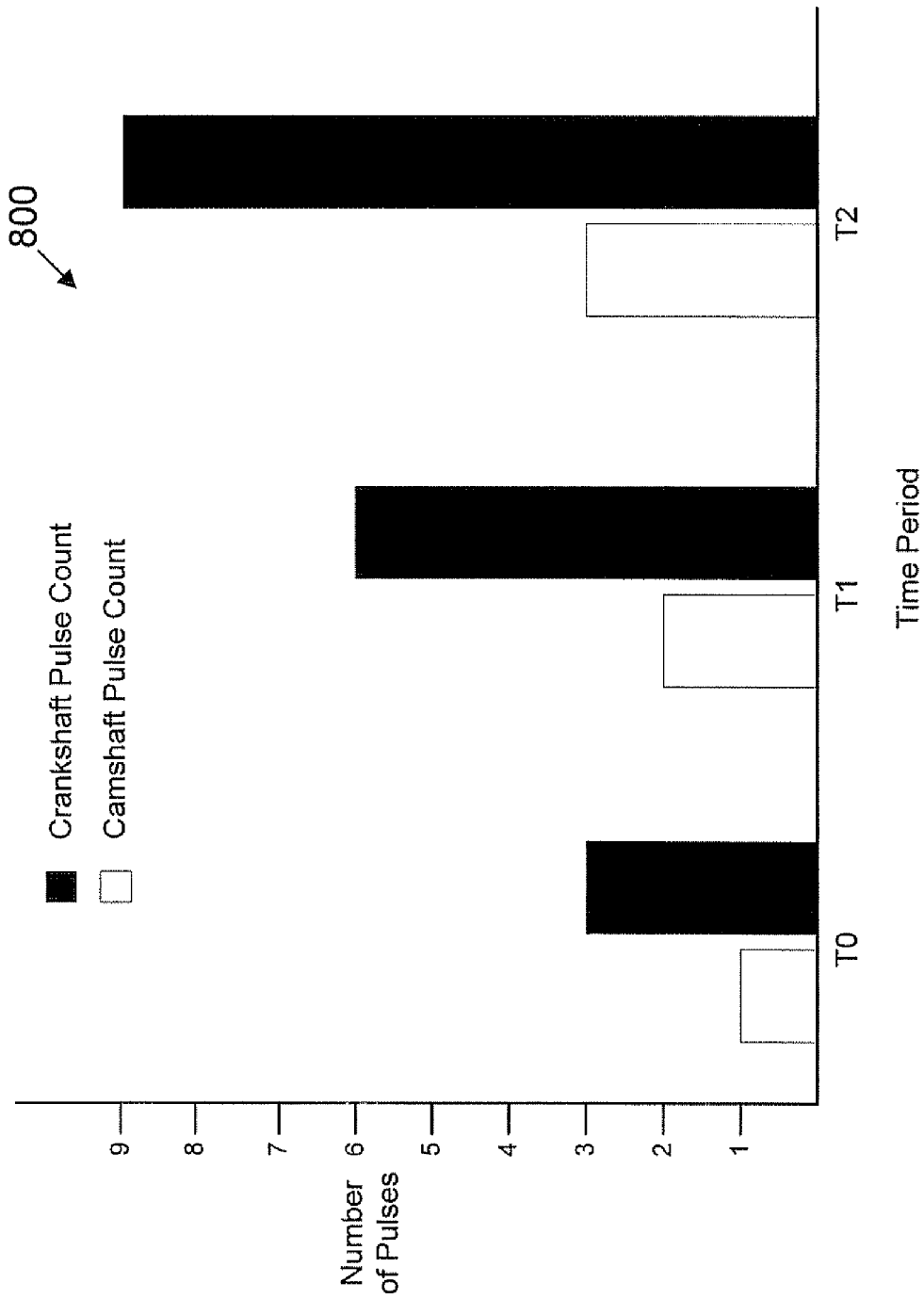
FIG. 8 is a bar graph depicting a correlation between a first parameter and a second parameter, according to an example embodiment.

In another respect, analyzing the open-formatted data may include displaying a representation of the correlation between the first and second parameters. FIG. 8 is a bar graph 800 depicting the correlation between the crank shaft sensor pulse count parameter and the cam shaft sensor pulse count parameter, according to an example embodiment. Of course, other examples exist for displaying a representation of the correlation between the first and second parameters.

In one embodiment, analyzing the open-formatted data may include formulating a new parameter based on a first parameter and a second parameter. As examples, formulating the new parameter may include performing one or more arithmetic operations on the first and second parameters (e.g., adding and multiplying), applying one or more algorithms or formulas to the first and second parameters, and/or offsetting (i.e., adding or subtracting) the first and/or second parameter by a predetermined numeric value. Further, formulating the new parameter may include scaling the first and second parameters to a common range and/or unit of measurement. Additionally, scaling the first and second parameters may include linear and/or non-linear scaling.

As an example, the first parameter may include an oxygen sensor parameter that is linearly scaled to a count ranging from 0 to 255, the count representing a voltage that may range from −1 to 1 Volts. The second parameter may include a mass airflow sensor parameter that is also linearly scaled to a count ranging from 0 to 255, the count representing a voltage that may range from 0 to 5 Volts. Formulating the new parameter may include adding the respective counts that represent the oxygen sensor parameter and the mass airflow sensor parameter to formulate a single count ranging from 0 to 510. Of course, other examples exist for formulating the new parameter.

Figure 9:
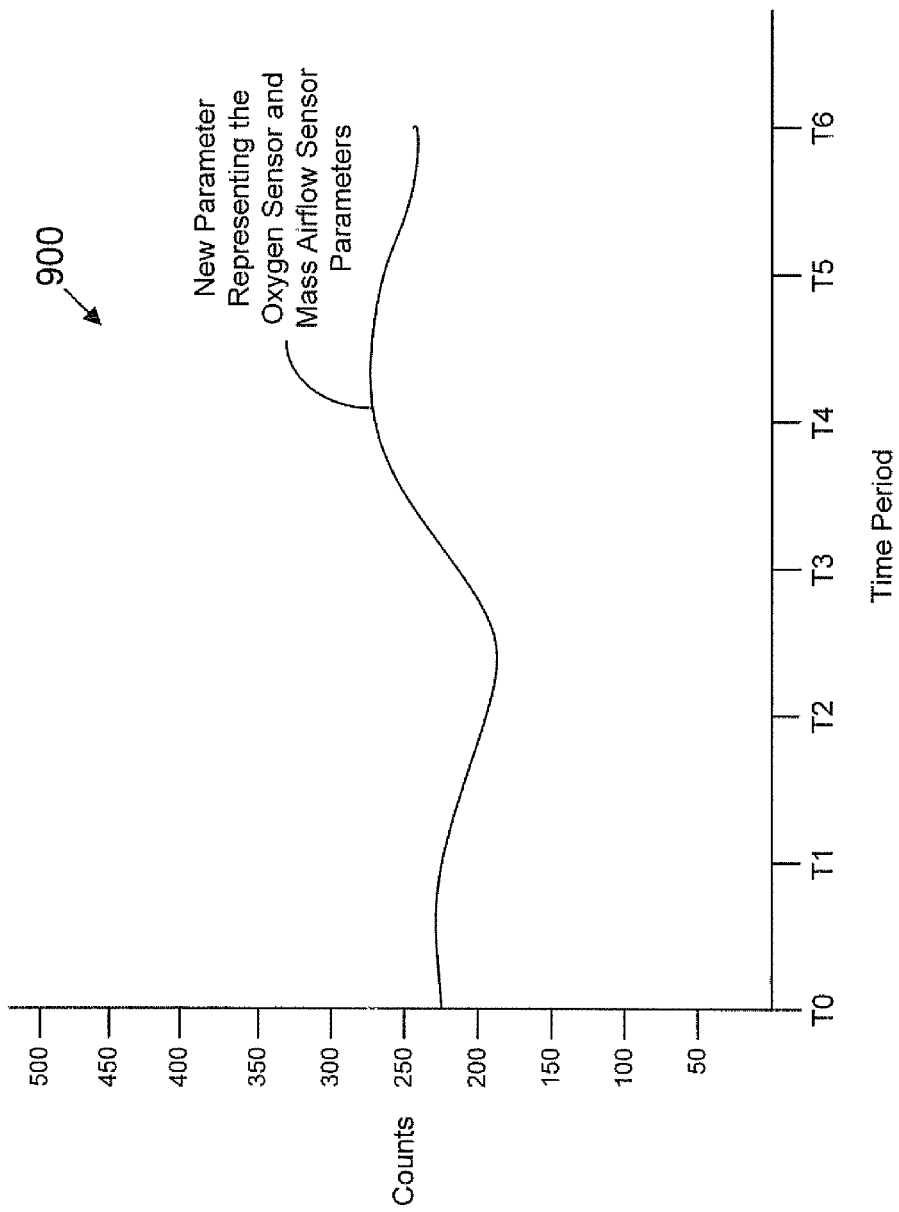
FIG. 9 is a line graph providing an indication of a new parameter over a given period of time, according to an example.

In another embodiment, analyzing the open-formatted data may include providing an indication of the new parameter. As an example, the new parameter representing oxygen sensor parameter and the mass airflow sensor parameter may be graphed as a line graph over a given period of time. By way of example, FIG. 9 is a line graph 900 providing an indication of the new parameter over a given period of time, according to an example. Providing the indication of the new parameter in such a way may enhance the technician's 100 diagnostic capabilities. As an example, the technician 100 may analyze the line graph 900, or any other indication of the new parameter, to determine period trends of the vehicle 104 over time, for instance.

As set forth above, methods and systems for providing open access to vehicle data are disclosed. By providing vehicle data in an open format, which may be viewable by a variety of standard applications (e.g., Microsoft Word, Microsoft Excel, Internet Explorer, and other common applications), for instance, third parties will have greater access to the vehicle data. In particular, third parties will not be required to purchase proprietary software from the manufacturer, for instance, to view the vehicle data.

When third parties have greater (i e, open) access to such vehicle data, a larger community of people will have more opportunity to create and share new developments and processes relating to the vehicle data—more so than when access to the vehicle data was restricted. Further, by providing the vehicle data in an open format that can be viewed by a variety of standard applications, for instance, and by transmitting the vehicle data to a remote device, the vehicle data may be more accessible and/or portable.

IV. Conclusion

Example embodiments of a system and method have been described above. Those skilled in the art will understand, however, that changes and modifications may be made to these examples without departing from the true scope and spirit of the described systems and methods. The embodiments described in this description and the accompanying drawings are set forth for illustration and not as a limitation.

We claim:

1. A method for providing vehicle diagnostic data in a mark-up language format, the method comprising:
   receiving, by a vehicle service tool from a vehicle-under-service connected to the vehicle service tool, vehicle diagnostic data in a manufacturer-specified format originating at an electronic control unit of the vehicle-under-service;
   converting, by the vehicle service tool, the vehicle diagnostic data in the manufacturer-specified format into vehicle diagnostic data in a closed format readable by an application on the vehicle service tool;
   displaying, by the vehicle service tool using a user interface including a display, the vehicle diagnostic data in the closed format;
   converting, by the vehicle service tool, the vehicle diagnostic data in the closed format into vehicle diagnostic data in a mark-up language format; and
   transmitting, by the vehicle service tool using a network interface, the vehicle diagnostic data in the mark-up language format to a communication network for transmission to a remote device distinct from the vehicle service tool.

2. The method of claim 1, further comprising:
   providing, via the remote device, access to the vehicle diagnostic data in the mark-up language format for viewing of the vehicle diagnostic data in the mark-up language format via a viewing application.

3. The method of claim 2, wherein the viewing application is selected from the group consisting of Microsoft Word, Microsoft Excel, Mozilla Firefox, and Internet Explorer.

4. The method of claim 1, wherein the markup-language format is selected from the group consisting of an Extensible Markup Language (XML) format, a Hypertext Markup Language (HTML) format, a Standard Generalized Markup Language (SGML) format, and an Extensible Hypertext Markup Language (XHTML) format.

5. The method of claim 1, wherein the vehicle diagnostic data in the markup-language format comprises a plurality of tags and a structure to cooperatively describe the vehicle diagnostic data in the mark-up language format converted from the vehicle diagnostic data in the closed format.

6. The method of claim 1, wherein converting the vehicle diagnostic data in the closed format into the vehicle diagnostic data in the markup-language format comprises:
   extracting vehicle data from the vehicle diagnostic data in the closed format;
   associating the extracted vehicle data to corresponding tags; and
   writing the extracted vehicle data and corresponding tags to a markup-language data file.

7. The method of claim 1, further comprising:
   providing, via the remote device, access to the vehicle diagnostic data in the mark-up language format for searching of the vehicle diagnostic data in the mark-up language format via an internet browser.

8. The method of claim 1, further comprising:
   formulating, by the vehicle service tool, a new parameter by execution of computer-readable program instructions that perform one or more arithmetic operations on a first parameter and a second parameter within a plurality of parameters.

9. The method of claim 8,
   wherein the vehicle diagnostic data in the mark-up language format comprises the plurality of parameters including the first parameter and the second parameter,
   the method further comprising:
   providing, using the user interface including the display, an indication of the new parameter.

10. The method of claim 1,
    wherein the vehicle diagnostic data in the manufacturer-specified format includes multiple parameters without a corresponding timestamp;
    the method further comprising:
    associating, by the vehicle service tool, a corresponding timestamp with each of the multiple parameters,
    wherein the vehicle diagnostic data in the mark-up language format includes the multiple parameters and the corresponding timestamps.

11. The method of claim 1, wherein converting the vehicle diagnostic data in the closed format into vehicle diagnostic data in the mark-up language format comprises automatically converting the vehicle diagnostic data in the closed format into the vehicle diagnostic data in the mark-up language format in response to converting the vehicle diagnostic data in the manufacturer-specified format into the vehicle diagnostic data in the closed format.

12. The method of claim 1, wherein converting the vehicle diagnostic data in the closed format into vehicle diagnostic data in the mark-up language format occurs in response to receiving from the user interface an instruction to convert the vehicle diagnostic data in the closed format into the vehicle diagnostic data in the mark-up language format.

13. The method of claim 1, further comprising:
    storing the computer-readable program instructions within a data storage device of the vehicle service tool,
    wherein execution of the computer-readable program instructions occurs using a processor of the vehicle service tool.

14. The method of claim 1, further comprising:
    providing, by the user interface including the display, an indication of the new parameter.

15. The method of claim 14, further comprising:
    providing a graphical indication of new parameters, wherein the new parameters comprise the new parameter based on the first parameter and the second parameter and multiple other parameters, wherein each of the multiple other parameters is formulated based on a respective other instance of the first parameter and a respective other instance of the second parameter.

16. The method of claim 15, wherein each first parameter and second parameter pair upon which each new parameter is based correspond to a common sample time.

17. The method of claim 1,
    wherein the vehicle diagnostic data in the mark-up language format comprises a plurality of parameters including a first parameter and a second parameter,
    the method further comprising:
    determining a correlation between the first parameter and the second parameter in the plurality of parameters; and
    displaying a representation of the correlation between the first parameter and the second parameter.

18. The method of claim 1, wherein the vehicle diagnostic data in the manufacturer-specified format is arranged according to a Society of Automotive Engineers (SAE) standard or an International Organization for Standardization (ISO) standard.

19. A vehicle service tool for providing vehicle diagnostic data in a mark-up language format, the vehicle service tool comprising:
    a vehicle interface configured for connection of the vehicle service tool to a vehicle-under-service and for receiving vehicle diagnostic data in a manufacturer-specified format originating at an electronic control unit of the vehicle-under service;
    a processor that converts the vehicle diagnostic data in the manufacturer-specified format into vehicle diagnostic data in a closed format and that converts the vehicle diagnostic data in the closed format into vehicle diagnostic data in a mark-up language format;
    a user interface including a display for displaying the vehicle diagnostic data in the closed format by the vehicle service tool; and
    a network interface that transmits the vehicle diagnostic data in the mark-up language format to a communication network for transmission to a remote device distinct from the vehicle service tool.

20. The system of claim 19, further comprising:
    a data storage device containing computer-readable program instructions executable by the processor to formulate a new parameter by performing one or more arithmetic operations on a first parameter and a second parameter within the vehicle diagnostic data in the mark-up language format.

21. The system of claim 20,
    wherein the vehicle diagnostic data in the mark-up language format comprises a plurality of parameters including the first parameter and the second parameter,
    wherein the remote device comprises a user interface, the processor, and the data storage device, and
    wherein the remote device causes the user interface to provide an indication of the new parameter.

22. The system of claim 19, wherein the vehicle diagnostic data in the manufacturer-specified format is arranged according to a Society of Automotive Engineers (SAE) standard or an International Organization for Standardization (ISO) standard.

23. A vehicle service tool for providing vehicle diagnostic data in a mark-up language format, the vehicle service tool comprising:
    a vehicle interface configured for connection of the vehicle service tool to a vehicle-under-service and for receiving vehicle diagnostic data in a manufacturer-specified format originating at an electronic control unit of the vehicle-under-service;

a processor;

a non-transitory data storage device comprising instructions executable by the processor to convert the vehicle diagnostic data in the manufacturer-specified format into vehicle diagnostic data in a closed format and to convert the vehicle diagnostic data in the closed format into vehicle diagnostic data in a mark-up language format;

a user interface device including a display configured for displaying the vehicle diagnostic data in the closed format by the vehicle service tool; and a network interface that transmits the vehicle diagnostic data in the mark-up language format to a communication network for transmission to a remote device distinct from the vehicle service tool.

24. The system of claim 19,
wherein the vehicle diagnostic data in the closed format is readable by a particular application on the vehicle service tool.

25. The vehicle service tool of claim 23, wherein the vehicle diagnostic data in the manufacturer-specified format is arranged according to a Society of Automotive Engineers (SAE) standard or an International Organization for Standardization (ISO) standard.

26. The system of claim 19,
wherein the vehicle diagnostic data in the mark-up language format comprises a plurality of parameters including a first parameter and a second parameter,
wherein the remote device comprises a user interface, and
wherein the remote device determines a correlation between the first parameters and the second parameter in the plurality of parameters, and causes the user interface to display a representation of the correlation between the first parameter and the second parameter.

27. The vehicle service tool of claim 23, wherein the remote device provides access to the vehicle diagnostic data in the mark-up language format for viewing of the vehicle diagnostic data in the mark-up language format via a viewing application.

28. The vehicle service tool of claim 27, wherein the viewing application is selected from the group consisting of Microsoft Word, Microsoft Excel, Mozilla Firefox, and Internet Explorer.

29. The vehicle service tool of claim 23, wherein the non-transitory data storage device further comprises instructions executable by the processor to formulate a new parameter by performing one or more arithmetic operations on a first parameter and a second parameter within the vehicle diagnostic data in the mark-up language format.

30. The vehicle service tool of claim 23,
wherein the vehicle diagnostic data in the mark-up language format comprises a plurality of parameters including a first parameter and a second parameter, and
wherein the data storage device further including instructions to:
determine a correlation between the first parameter and the second parameter; and
cause the user interface to display a representation of the correlation between the first parameter and the second parameter.

31. The vehicle service tool of claim 29,
wherein the vehicle diagnostic data in the mark-up language format comprises a plurality of parameters including the first parameter and the second parameter, and
wherein the data storage device further includes instructions executable by the processor to cause the user interface to provide an indication of the new parameter.

32. The method of claim 8, wherein formulating the new parameter comprises scaling the first parameter and the second parameter to a common range or unit of measurement.

* * * * *